(12) United States Patent
Kaga

(10) Patent No.: US 11,228,708 B2
(45) Date of Patent: Jan. 18, 2022

(54) IMAGE PICKUP APPARATUS AND IMAGE PICKUP SYSTEM

(71) Applicant: Ricoh Company, Ltd., Tokyo (JP)

(72) Inventor: Ryota Kaga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/479,967

(22) PCT Filed: Mar. 8, 2018

(86) PCT No.: PCT/JP2018/009037
§ 371 (c)(1),
(2) Date: Jul. 23, 2019

(87) PCT Pub. No.: WO2018/168652
PCT Pub. Date: Sep. 20, 2018

(65) Prior Publication Data
US 2019/0342495 A1 Nov. 7, 2019

(30) Foreign Application Priority Data

Mar. 16, 2017 (JP) .............................. JP2017-050712

(51) Int. Cl.
*H04N 5/232* (2006.01)
*G02B 13/06* (2006.01)
(Continued)

(52) U.S. Cl.
CPC ......... *H04N 5/23238* (2013.01); *G02B 13/06* (2013.01); *H04N 5/2253* (2013.01);
(Continued)

(58) Field of Classification Search
CPC ...... H04R 1/405; H04R 3/005; H04R 29/005; H04N 5/23238
See application file for complete search history.

(56) References Cited

U.S. PATENT DOCUMENTS 5,260,920 A 11/1993 Ide et al.
7,852,369 B2 12/2010 Cutler et al.
(Continued)

FOREIGN PATENT DOCUMENTS

DE 3512155 A1 10/1985
EP 3067855 A1 9/2016
(Continued)

OTHER PUBLICATIONS

International Search Report issued with Written Opinion dated May 18, 2018 in PCT/JP2018/009037 filed on Mar. 8, 2018.
(Continued)

*Primary Examiner* — Kyle M Lotfi
(74) *Attorney, Agent, or Firm* — Xsensus LLP

(57) ABSTRACT

[Object] An object is to provide an image pickup apparatus and an image pickup system with which it is possible to reproduce an image with a realistic feeling. [Means of Achieving the Object] An image pickup apparatus includes an image forming optical system that includes a plurality of wide angle lenses; an image device; and four or more sound pickup devices installed at respective vertexes of a triangular pyramid.

15 Claims, 16 Drawing Sheets

(51) Int. Cl.
*H04N 5/225* (2006.01)
*H04R 5/027* (2006.01)
*H04R 1/40* (2006.01)
*H04R 1/02* (2006.01)

(52) U.S. Cl.
CPC ........... *H04N 5/2258* (2013.01); *H04R 1/028* (2013.01); *H04R 5/027* (2013.01); *H04R 1/406* (2013.01); *H04R 2499/11* (2013.01)

(56) References Cited

U.S. PATENT DOCUMENTS

| | | | |
|---|---|---|---|
| 8,184,815 B2 | 5/2012 | Kawano | |
| 8,456,569 B2 | 6/2013 | Kaga et al. | |
| 8,638,390 B2 | 1/2014 | Shinohara et al. | |
| 8,736,753 B2 | 5/2014 | Kaga et al. | |
| 8,792,050 B2 | 7/2014 | Shinohara et al. | |
| 8,836,853 B2 | 9/2014 | Shinohara et al. | |
| 9,185,279 B2 | 11/2015 | Masuda et al. | |
| 9,260,909 B2 | 2/2016 | Kaga | |
| 9,554,041 B1* | 1/2017 | Shin | H04N 5/2258 |
| 2010/0081487 A1* | 4/2010 | Chen | H04M 9/082 455/575.1 |
| 2010/0194880 A1* | 8/2010 | Furutani | G03B 15/00 348/135 |
| 2011/0096206 A1* | 4/2011 | Okazaki | H04R 3/005 348/241 |
| 2016/0080867 A1 | 3/2016 | Nugent | |
| 2016/0191815 A1 | 6/2016 | Annau et al. | |
| 2016/0269632 A1 | 9/2016 | Morioka | |
| 2017/0265012 A1* | 9/2017 | Tico | H04R 3/005 |
| 2017/0311080 A1* | 10/2017 | Kolb | H04R 1/342 |
| 2019/0230283 A1* | 7/2019 | Ollier | H04N 5/2254 |

FOREIGN PATENT DOCUMENTS

| | | |
|---|---|---|
| JP | 2001-298733 | 10/2001 |
| JP | 4753978 | 8/2011 |
| JP | 2013-150202 | 8/2013 |
| JP | 2013-198070 | 9/2013 |
| JP | 2016-046699 | 4/2016 |
| JP | 2016-114953 | 6/2016 |
| JP | 2017-41205 | 2/2017 |
| WO | 2014/177855 A1 | 11/2014 |

OTHER PUBLICATIONS

Office Action dated May 19, 2020 in corresponding Russian Patent Application No. 2019124983/07(048789) (with English Translation), 12 pages.

Japanese Office Action dated Nov. 24, 2020 in Application No. 2017-050712, therein with concise English translation. (3 pages).

* cited by examiner

[Fig. 1]
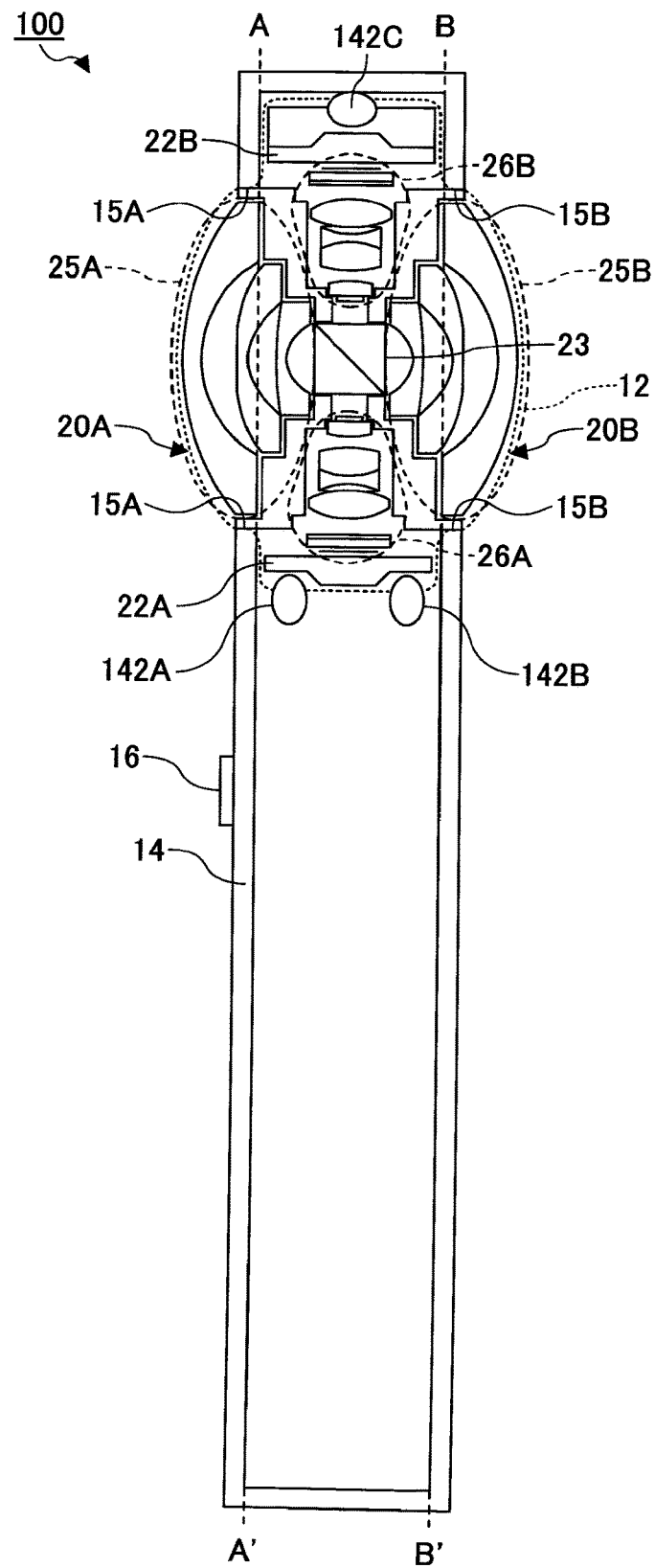

[Fig. 2]
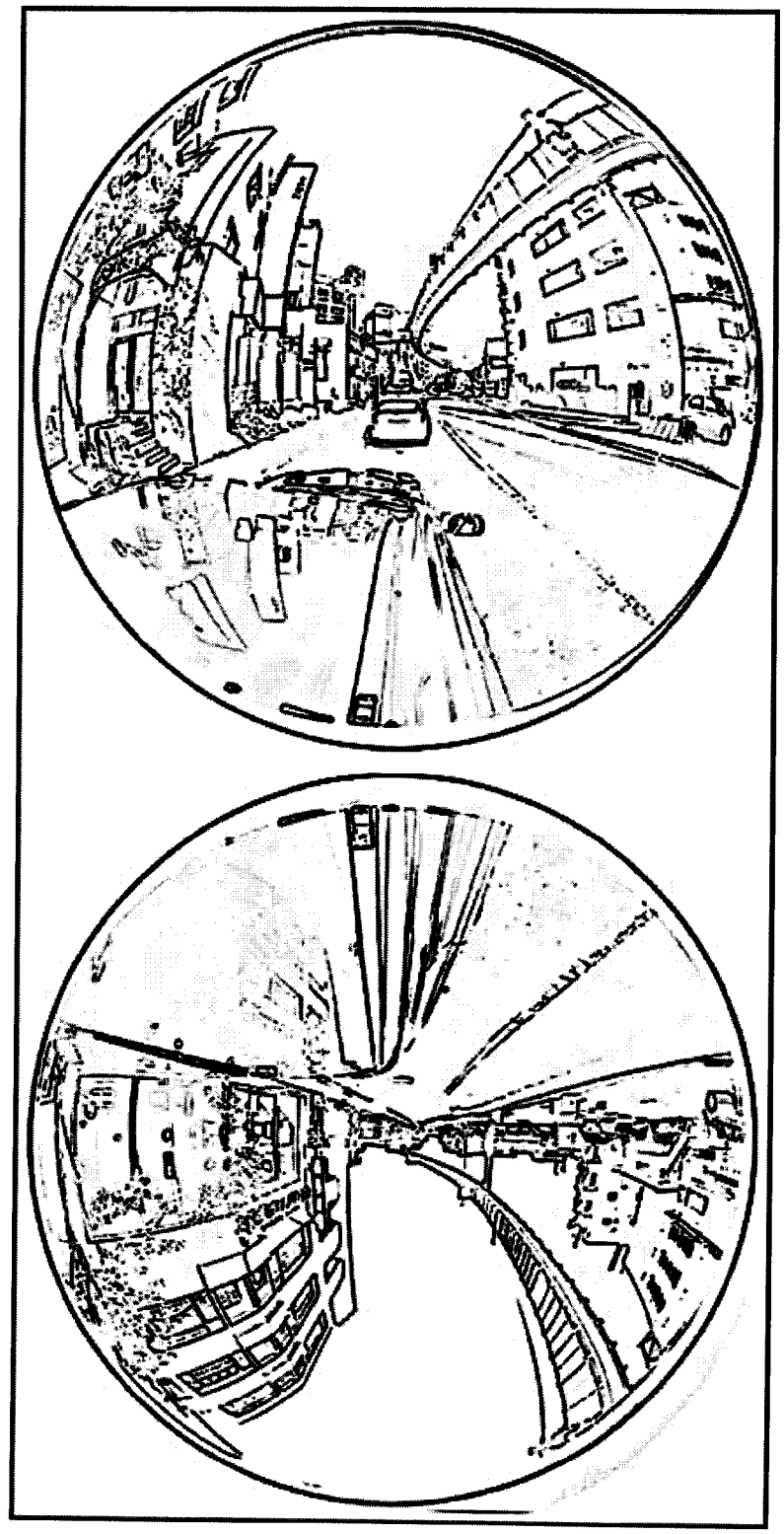

[Fig. 3]
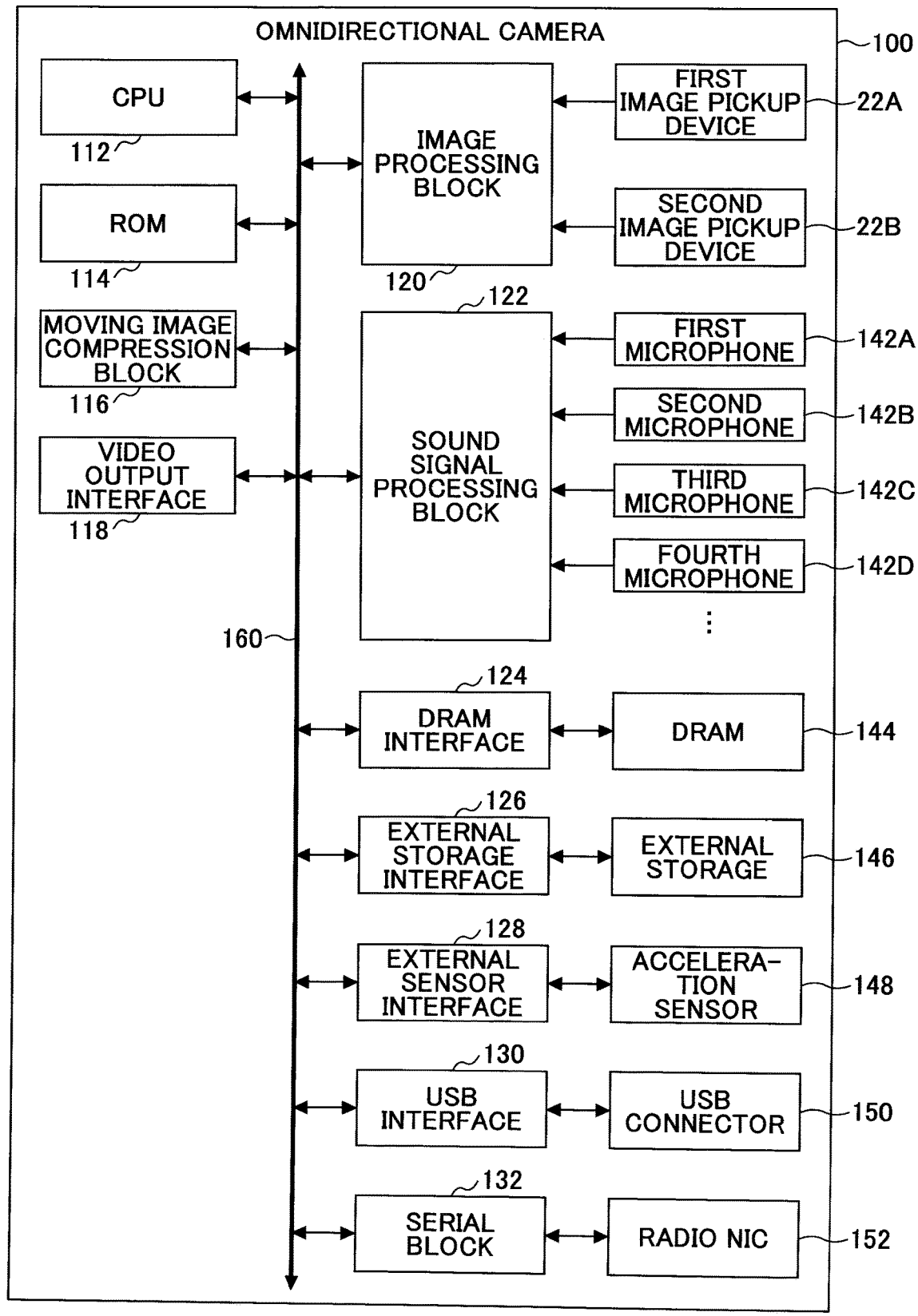

[Fig. 4A]
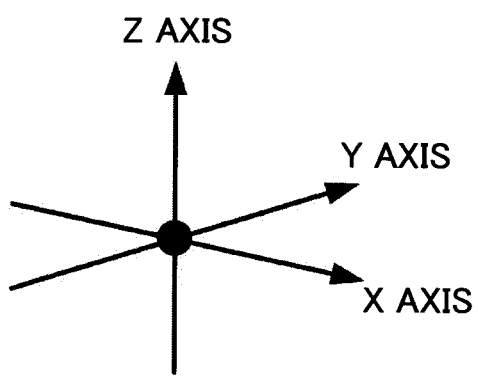
[Fig. 4B]
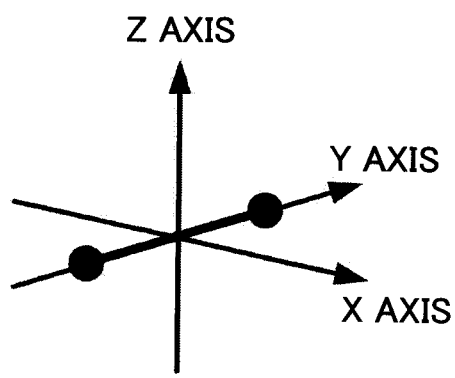

[Fig. 4C]
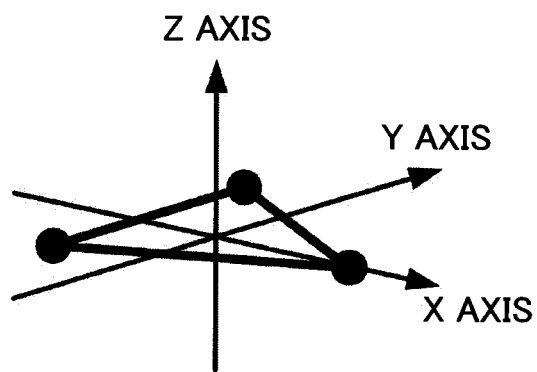
[Fig. 4D]
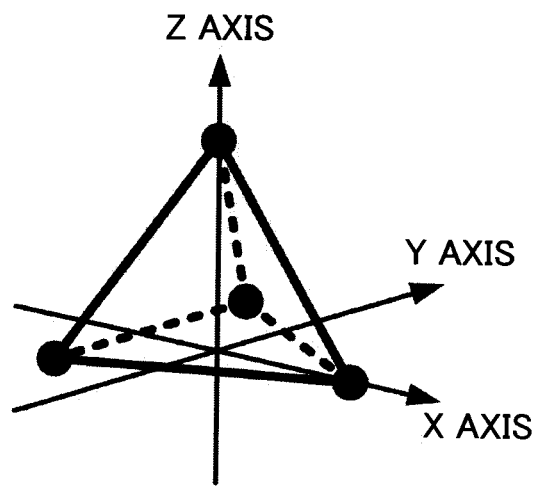

[Fig. 5A]
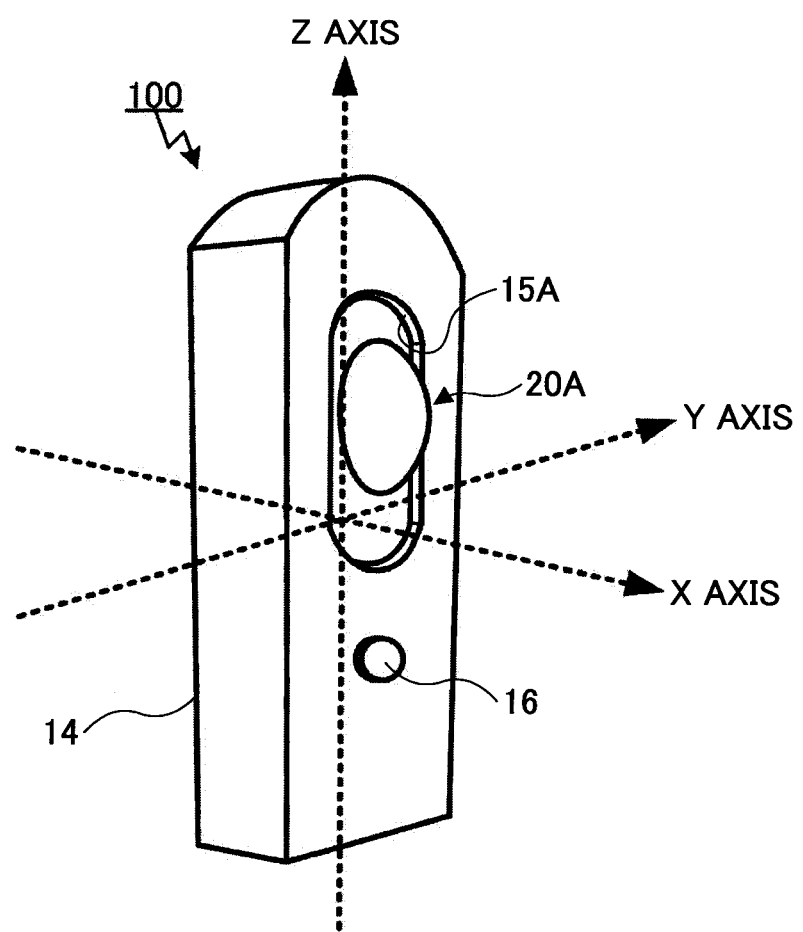

[Fig. 5B]
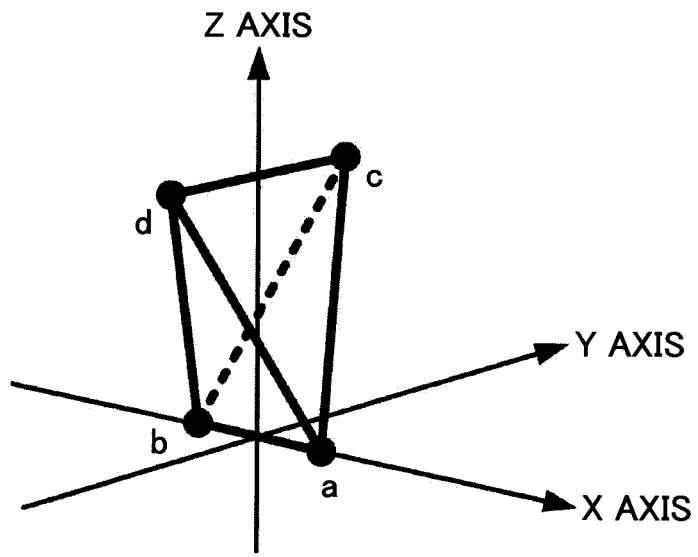
[Fig. 5C]
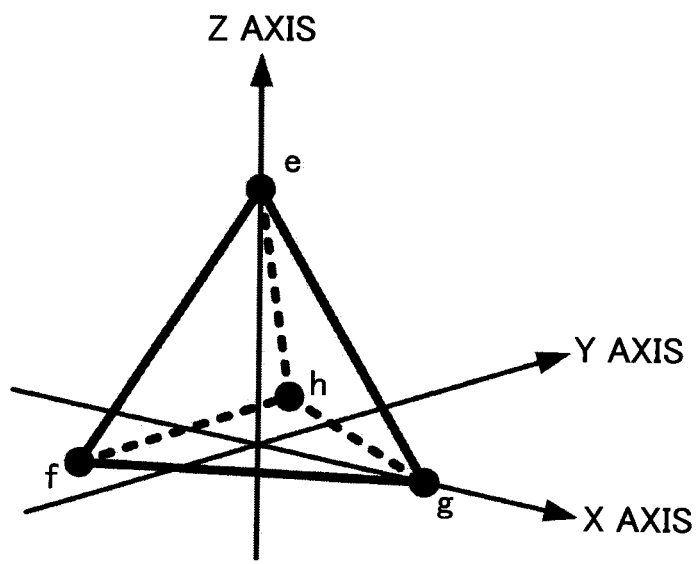

[Fig. 5D]
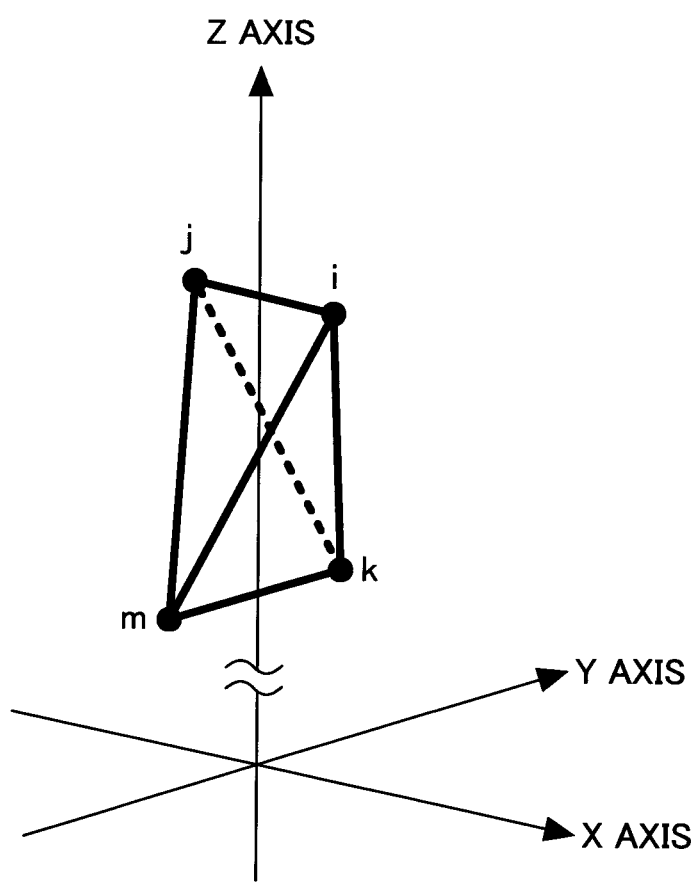

[Fig. 6A]
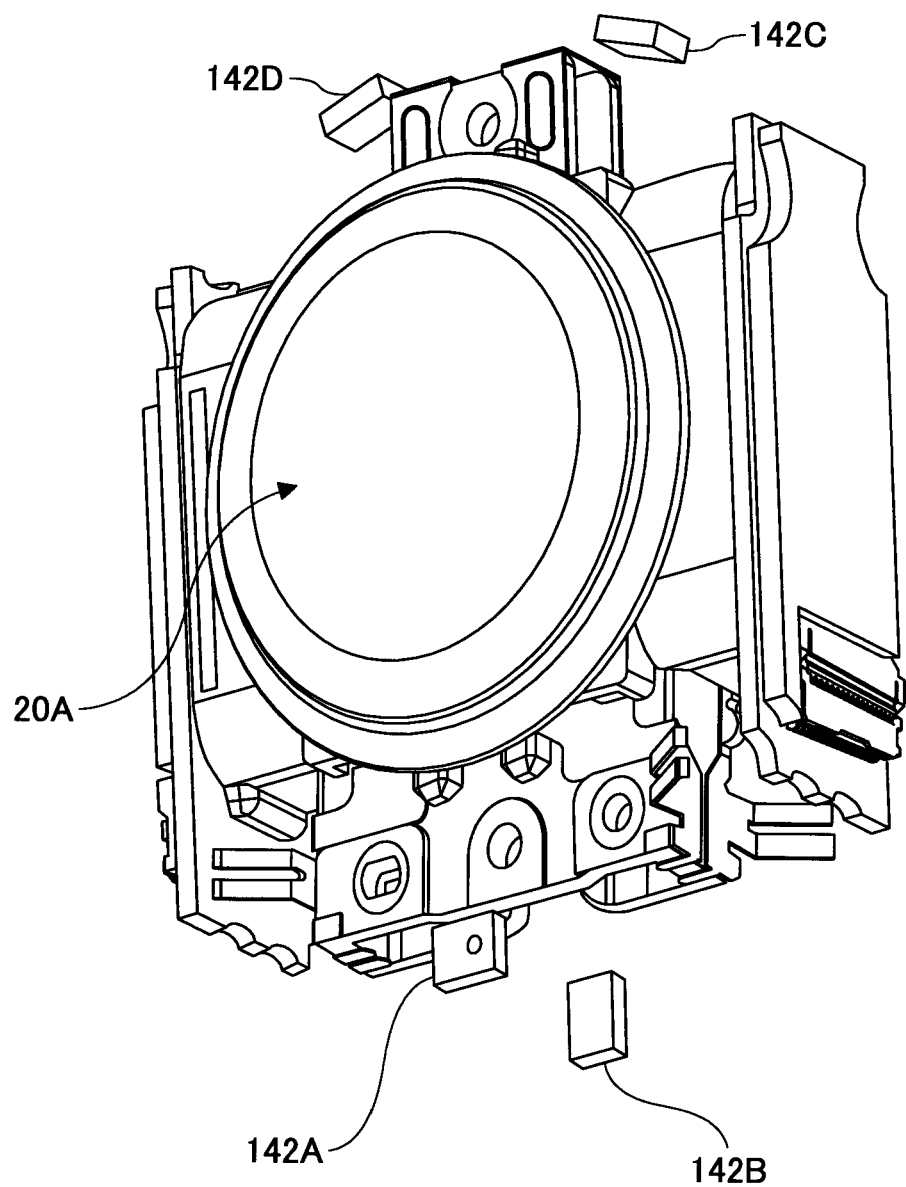

[Fig. 6B]
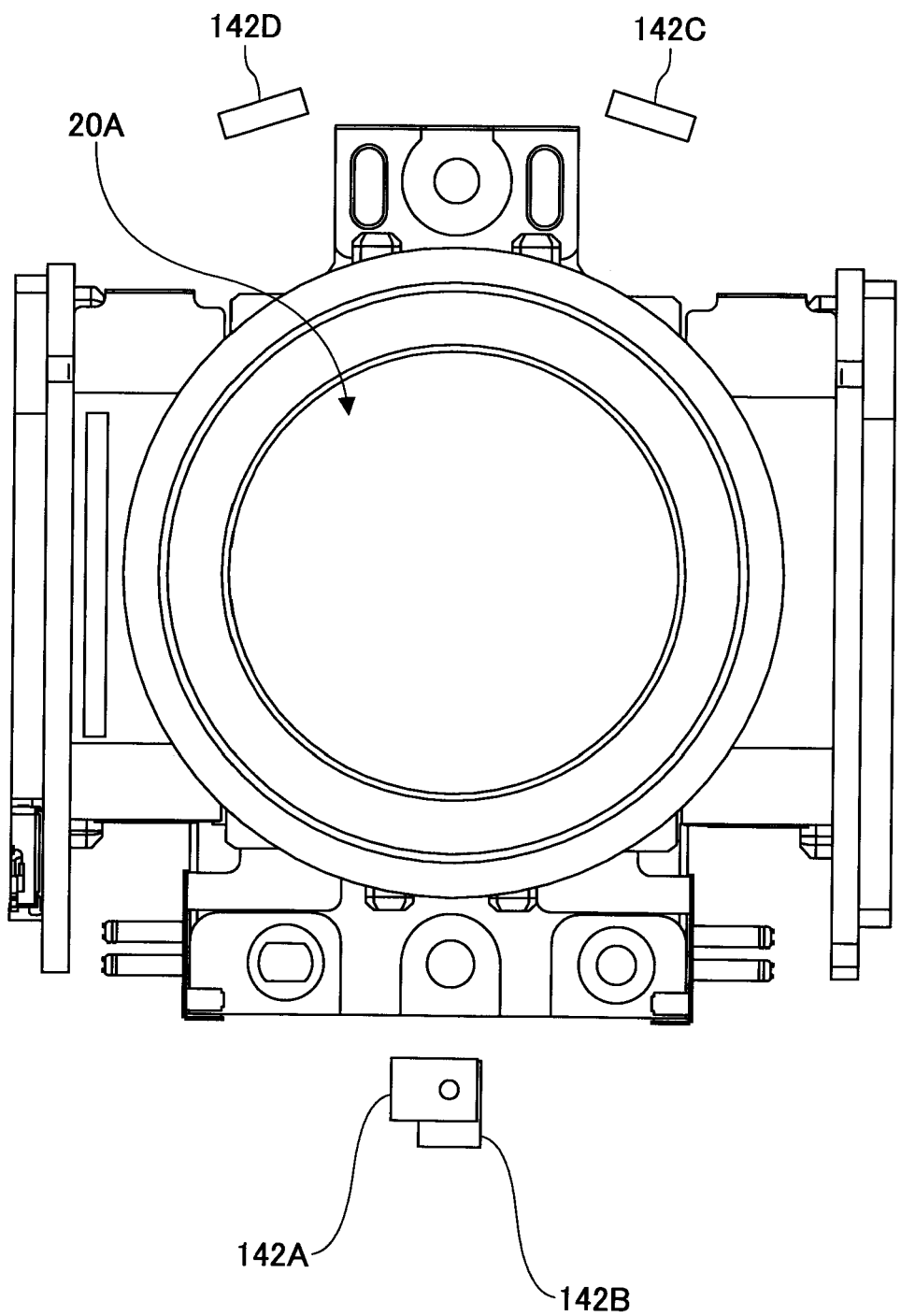

[Fig. 6C]
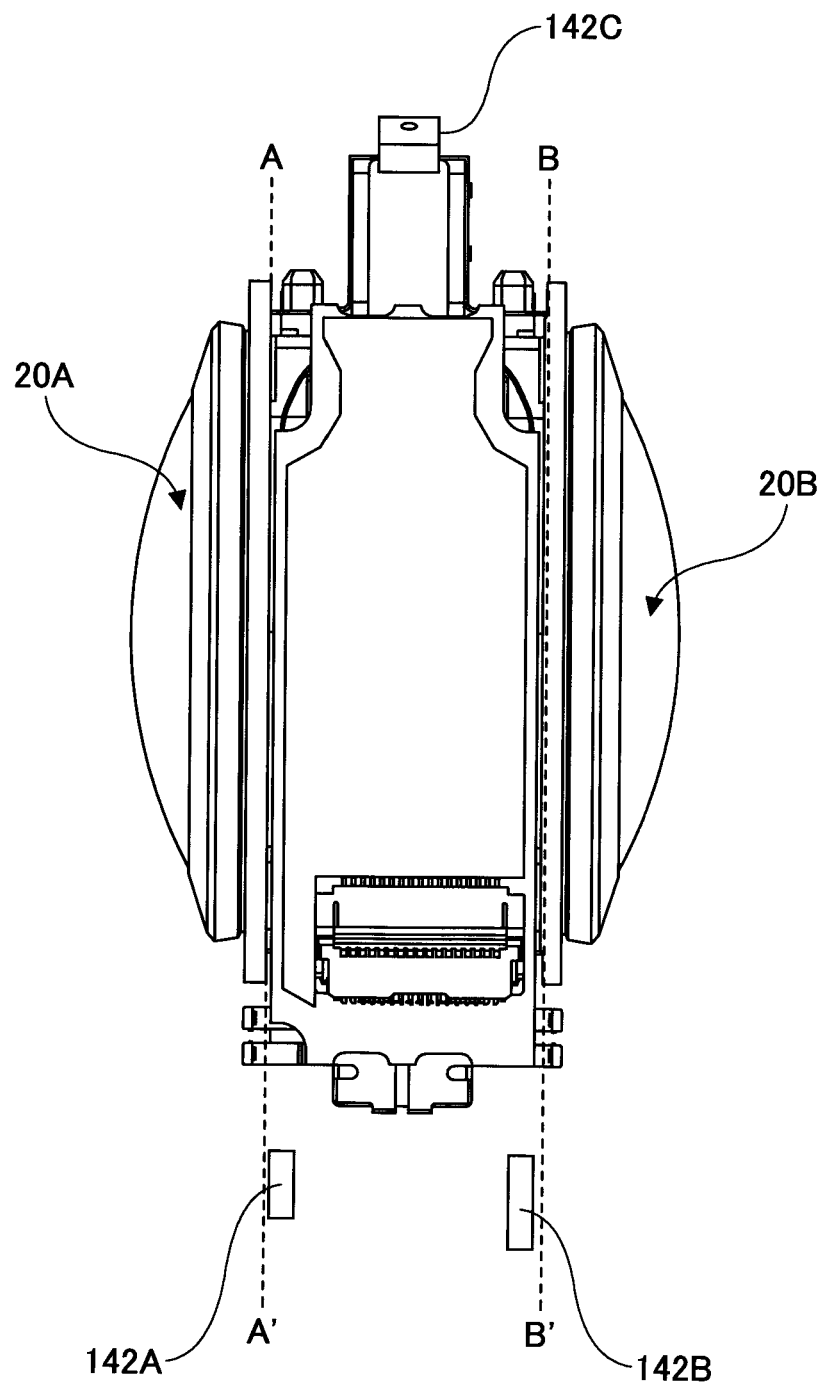

[Fig. 7A]
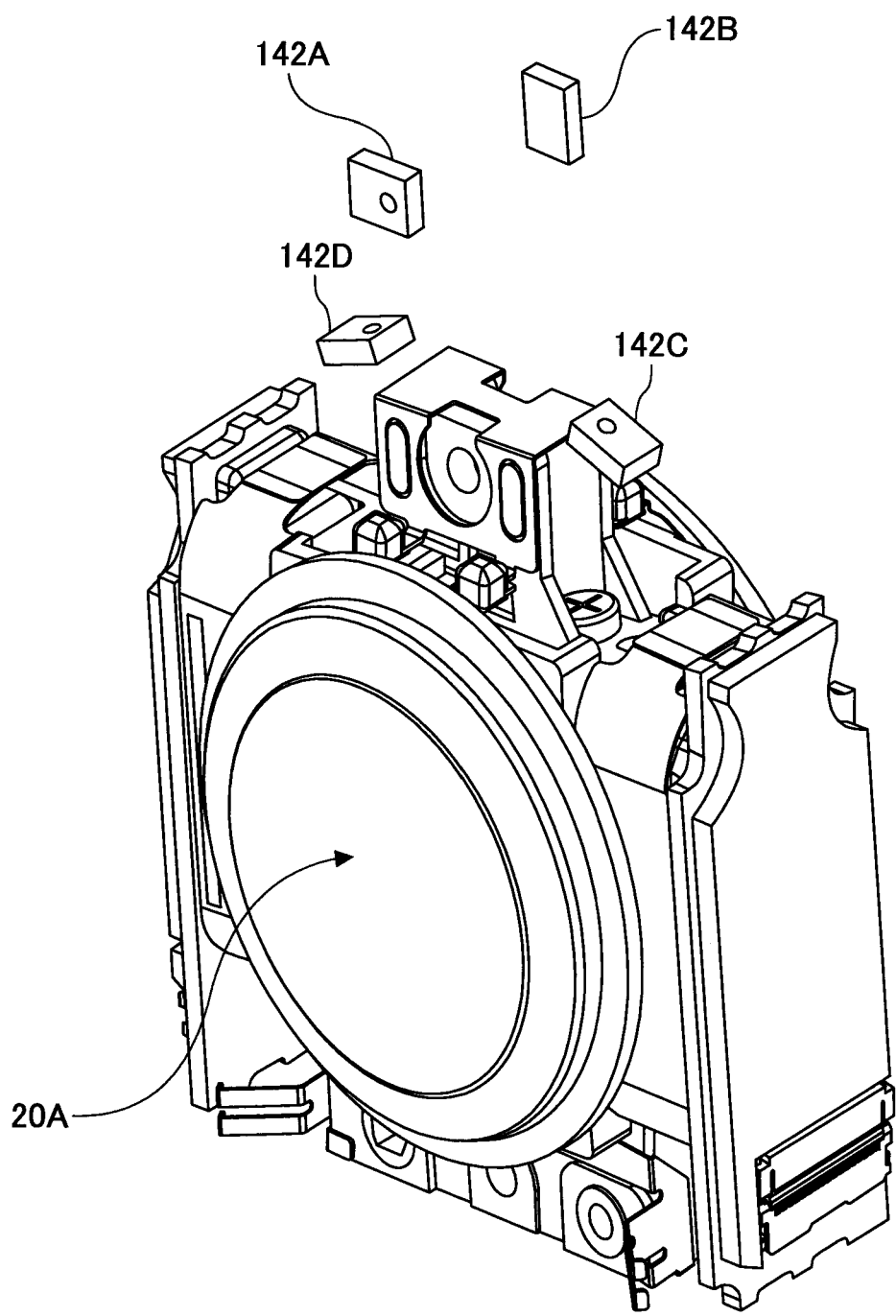

[Fig. 7B]
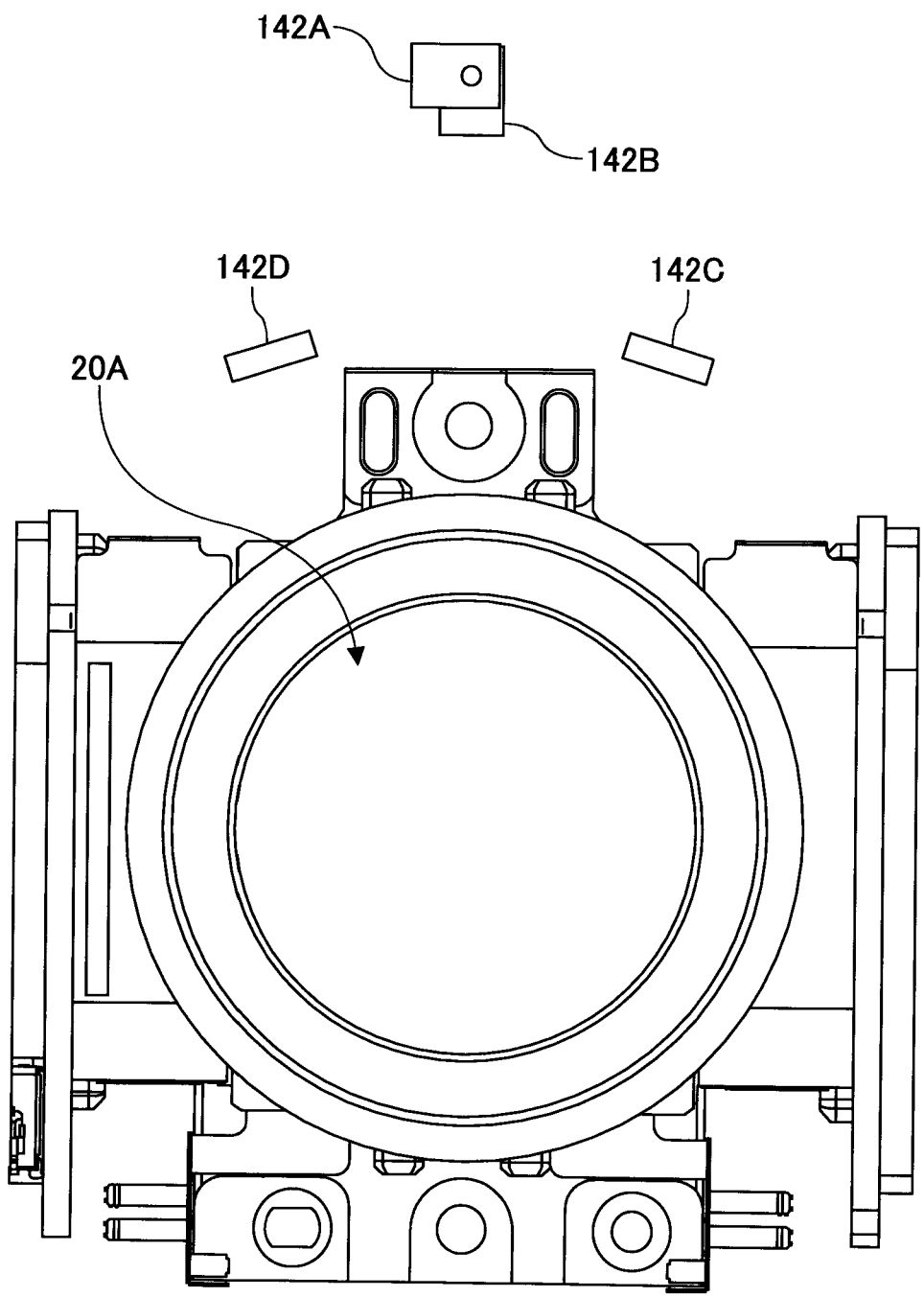

[Fig. 7C]
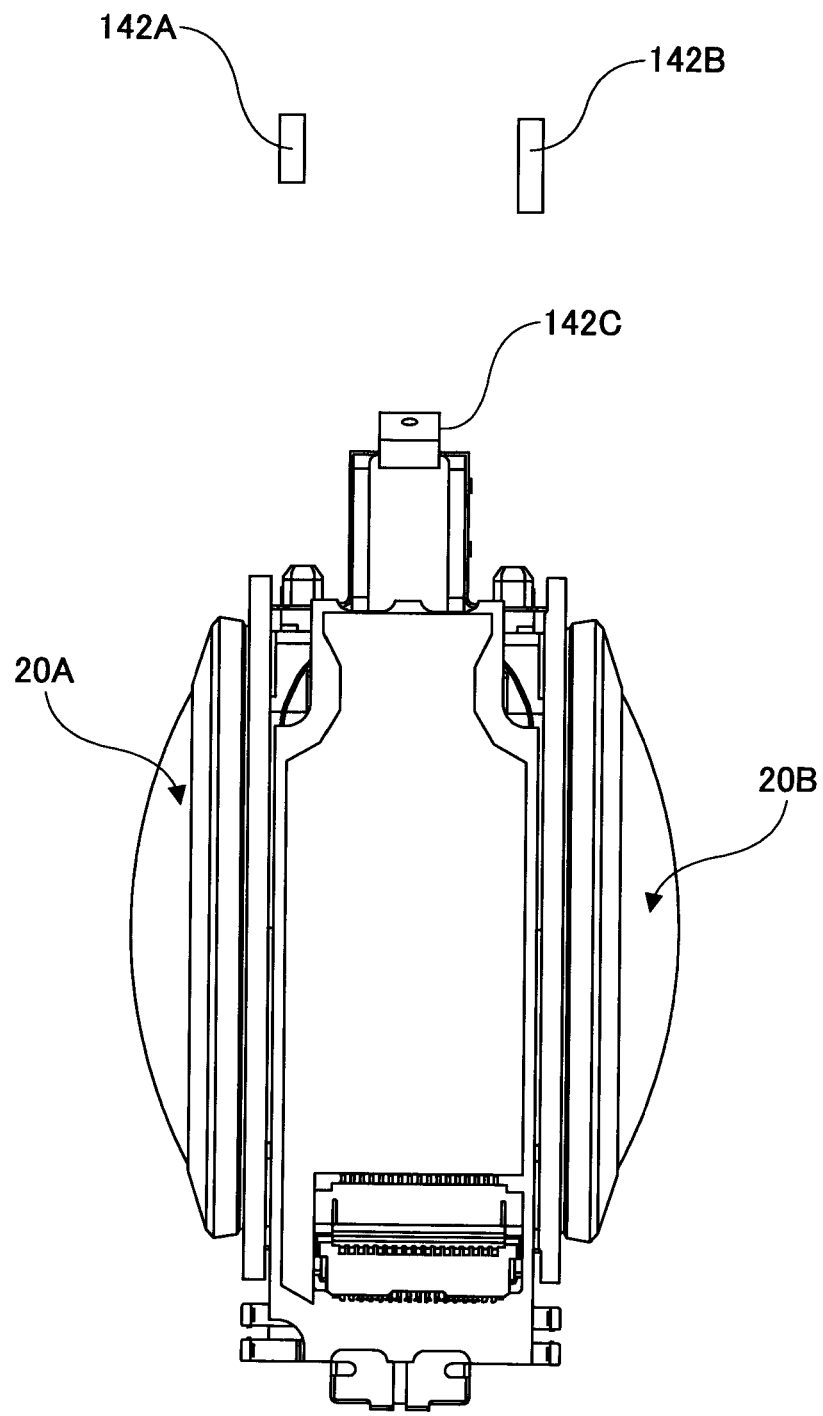

[Fig. 8A]
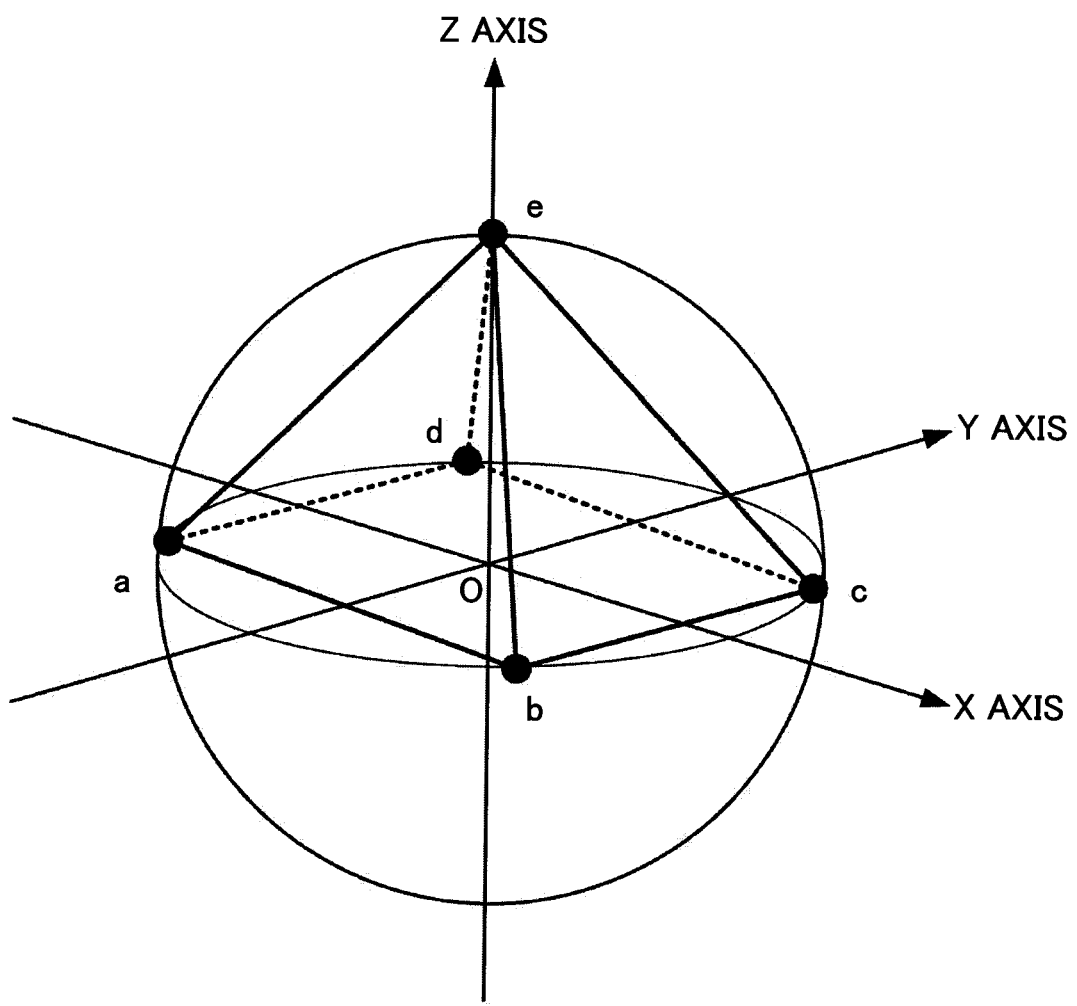

[Fig. 8B]
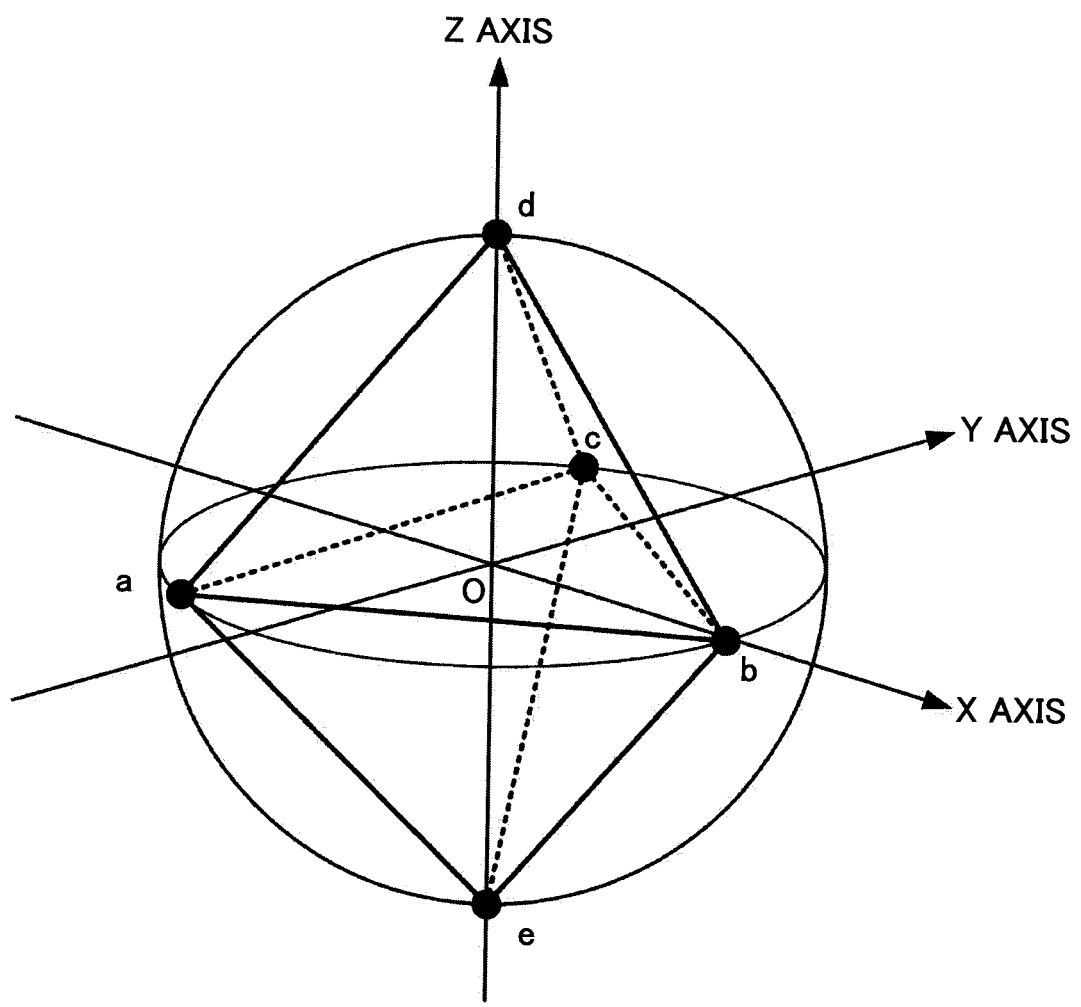

IMAGE PICKUP APPARATUS AND IMAGE PICKUP SYSTEM

TECHNICAL FIELD

The present invention relates to an image pickup apparatus and an image pickup system.

BACKGROUND ART

Recently, a technology of generating an omnidirectional image or an omnidirectional moving image on the basis of an image photographed by a camera is known.

In this regard, at a time of playback of an omnidirectional moving image in particular, it may be desired to reproduce the image with a realistic feeling.

For example, Japanese Unexamined Patent Application Publication No. 2001-298733 (Patent Reference No. 1) discloses a technology of photographing a half celestial spherical image or an entire celestial spherical image through cameras after transforming the half celestial spherical image or the entire celestial spherical image into a plane image through lenses; and projecting the transformed image on a screen through a projector. At this time, at least five three-dimensionally-arranged microphones 11 are used to collect sound.

However, Patent Reference No. 1 does not disclose a specific arrangement of the microphones with respect to the cameras. Thus, Patent Reference No. 1 does not clarify a simple configuration for reproducing an image with a realistic feeling.

SUMMARY OF INVENTION

Technical Problem

The present disclosure has an object to provide an image pickup apparatus and an image pickup system that are capable of easily reproducing an image with a realistic feeling.

Solution to Problem

According to the present disclosure, an image pickup apparatus includes an image forming optical system that includes a plurality of wide angle lenses; an image pickup device; and four or more sound pickup devices installed at respective vertexes of a triangular pyramid.

Advantageous Effects of Invention

As described above, according to the present disclosure, it is possible to provide an image pickup apparatus and an image pickup system that are capable of easily reproducing an image with a realistic feeling.

BRIEF DESCRIPTION OF DRAWINGS

Other objects, features, and advantages will become more apparent from the following detailed description when read in conjunction with the accompanying drawings.

FIG. 1 is a schematic sectional side elevational view illustrating an internal structure of an omnidirectional camera according to an embodiment.

FIG. 2 illustrates examples of images photographed by the omnidirectional camera.

FIG. 3 illustrates a hardware configuration of the omnidirectional camera.

FIG. 4A illustrates the number and an arrangement of microphones in one example.

FIG. 4B illustrates the number and an arrangement of microphones in another example.

FIG. 4C illustrates the number and an arrangement of microphones in further another example.

FIG. 4D illustrates the number and an arrangement of microphones in yet another example.

FIG. 5A illustrates a schematic perspective outline view of the omnidirectional camera.

FIG. 5B illustrates an example of an arrangement of microphones in the omnidirectional camera.

FIG. 5C illustrates another example of an arrangement of the microphones in the omnidirectional camera.

FIG. 5D illustrates yet another example of an arrangement of the microphones in the omnidirectional camera.

FIG. 6A is a perspective view of an image pickup unit in the omnidirectional camera illustrating an arrangement of the microphones that are used to acquire stereophonic sound in a first example.

FIG. 6B is a front elevational view of the image pickup unit in the omnidirectional camera illustrating the arrangement of the microphones that are used to acquire stereophonic sound in the first example.

FIG. 6C is a side elevational view of the image pickup unit in the omnidirectional camera illustrating the arrangement of the microphones that are used to acquire stereophonic sound in the first example.

FIG. 7A is a perspective view of the image pickup unit in the omnidirectional camera illustrating an arrangement of the microphones that are used to acquire stereophonic sound in a second example.

FIG. 7B is a front elevational view of the image pickup unit in the omnidirectional camera illustrating the arrangement of the microphones that are used to acquire stereophonic sound in the second example.

FIG. 7C is a side elevational view of the image pickup unit in the omnidirectional camera illustrating the arrangement of the microphones that are used to acquire stereophonic sound in the second example.

FIG. 8A illustrates one example of an arrangement of five microphones to acquire stereophonic sound.

FIG. 8B illustrates another example of an arrangement of five microphones to acquire stereophonic sound.

DESCRIPTION OF EMBODIMENTS

Now, embodiments of the present invention will be described. However, embodiments of the present invention are not limited to embodiments that will now be described.

Note that, in respective figures that will now be described, the same reference numerals are given to common elements, and description of the elements will be omitted as appropriate.

In the following description, what is referred to by a term "sound" is not limited to a voice that a person produces. The term "sound" may be used to generally refer to sound propagated as a result of vibrations of air such as music, a machine sound, an operating sound, and so forth.

FIG. 1 is a schematic sectional side elevational view illustrating an internal structure of an omnidirectional camera 100 as an example of an image pickup apparatus according to an embodiment of the present invention.

The omnidirectional camera 100 illustrated in FIG. 1 includes at least an image pickup unit 12, a housing 14, a shutter button 16, and microphones 142A-142D.

The image pickup unit 12 includes at least two image forming optical systems 20A and 20B, and two image pickup devices 22A and 22B. The image forming optical systems 20A and 20B include, as optical elements, front lens groups, a prism 23, rear lens groups, filters, aperture stops, and so forth.

The optical elements of the image forming optical systems 20A and 20B are classified into front optical element groups 25A and 25B, and rear optical element groups 26A and 26B, respectively.

Light passing through the front optical element group 25A is bent by the prism 23; passes through the rear optical element group 26A; and then is incident on and forms an image on the image pickup device 22A.

In the same way, light passing through the front optical element group 25B is bent by the prism 23; passes through the rear optical element group 26B; and then is incident on and forms an image on the image pickup device 22B.

For example, wide angle lenses or fisheye lenses included in the above-mentioned optical elements have full angles of view greater than 180 degrees (=360 (degrees)/n where optical coefficient n=2). More suitably, the wide angle lenses or the fisheye lenses may have angles of view greater than or equal to 185 degrees. Yet more suitably, the wide angle lenses or the fisheye lenses may have angles of view greater than or equal to 190 degrees.

The image pickup devices 22A and 22B convert light collected by the image forming optical systems 20A and 20B to image signals. The image pickup devices 22A and 22B include, for example, CCD (Charge Coupled Device) sensors, CMOS (Complementary Metal Oxide Semiconductor) sensors, or the like.

A combination of one wide angle image forming optical system and an image pickup device is called a wide angle image pickup optical system.

Positional relationships of the optical elements of the image forming optical systems 20A and 20B with respect to the image pickup devices 22A and 22B are appropriately determined.

More specifically, positioning is carried out in such a manner that the optical axes of the optical elements of the image forming optical systems 20A and 20B are perpendicular to and pass through central portions of the light receiving areas of the image pickup devices 22A and 22B, respectively; and the image forming planes of the fisheye lenses are coincident with the light receiving areas of the image pickup devices 22A and 22B, respectively.

The image forming optical systems 20A and 20B conform to the same specifications, and are combined in reverse directions in such a manner that the respective optical axes are coincident.

The image pickup devices 22A and 22B convert distributions of light received from the image forming optical systems 20A and 20B to image signals, and sequentially output image frames to an image processing unit included in a controller.

Images taken by the image forming optical systems 20A and 20B are formed on the respective light receiving areas of the image pickup devices 22A and 22B. As a result of the image pickup devices 22A and 22B synthesizing the respective images taken by the image forming optical systems 20A and 20B, an omnidirectional image is generated. For example, as a result of synthesizing half celestial spherical images illustrated in FIG. 2, an omnidirectional image is generated.

An omnidirectional image is an image having a solid angle of 4π steradians for a range fully three-dimensionally surrounding the omnidirectional camera 100. In this regard, an omnidirectional moving image is generated on the basis of sequential frames of omnidirectional images.

As illustrated in FIG. 1, a housing 14 holds components such as the image pickup unit 12, the controller, and a battery.

The housing 14 has openings 15A and 15B for exposing lenses of the image forming optical systems 20A and 20B. The lenses of the image forming optical systems 20A and 20B protrude from the housing 14 through the openings 15A and 15B.

The housing 14 has a shutter button 16. The shutter button 16 is used to input an instruction to the omnidirectional camera 100 to start photographing.

The microphones 142A-142D acquire sound surrounding the omnidirectional camera 100 and output sound signals.

The microphones 142A-142D may be directional microphones, or may be non-directional microphones. In a case of using directional microphones as the microphones 142A-142D, it is possible to acquire sound in specific directions. In a case of using non-directional microphones as the microphones 142A-142D, it is possible to easily perform calibration of the microphones. The microphones 142A-142D may include directional microphones and non-directional microphones in combination. In a case where at least one of the microphones 142A-142D is a non-directional microphone, calibration can be easily carried out, the cost can be reduced, and the individual variance can be reduced.

Next, a hardware configuration of the omnidirectional camera 100 will be described.

FIG. 3 illustrates an example of a hardware configuration of the omnidirectional camera 100 according to the embodiment.

The omnidirectional camera 100 includes a CPU (Central Processing Unit) 112, a ROM (Read-Only Memory) 114, a moving image compression block 116, an image processing block 120, a sound signal processing block 122, and a DRAM (Dynamic Random Access Memory) interface 124.

The CPU 112 controls operations of components and the entirety of the omnidirectional camera 100.

The ROM 114 stores a control program described in code interpretable by the CPU 112, and various parameters.

The moving image compression block 116 is a coding block that compresses and decompresses a moving image that is in accordance with MPEG-4 AVC/H.264 or the like.

The image processing block 120 is connected to the two image pickup devices 22A and 22B also illustrated in FIG. 1. Image signals of images taken by the respective image pickup devices 22A and 22B are input to the image processing block 120.

The image processing block 120 includes an ISP (Image Signal Processor) or the like, and carries out shading correction, Bayer interpolation, white balance correction, gamma correction, and so forth on the image signals that are input from the image pickup devices 22A and 22B.

The sound signal processing block 122 carries out various processes on sound signals acquired by sound pickup devices (i.e., the microphones 142A-142D).

The sound signal processing block 122 is connected to the at least four microphones 142A-142D inside the housing 14.

The respective sound signals acquired by the microphones 142A-142D are input to the sound signal processing block 122.

The sound signal processing block 122 includes preamplifiers, ADC (Analog to Digital Converters), various filters, compressors, and so forth, and carries out various processes such as signal amplification, A-D conversion, frequency separation, and so forth on the sound signals that are input from the microphones 142A-142D.

The sound signal processing block 122 is capable of outputting data for implementing playback of sound acquired by the microphones 142A-142D as a stereophonic sound. Playback as a stereophonic sound means playback of sound acquired by four or more microphones, as sound reflecting a three-dimensional direction of a sound source implemented by a plurality of speakers, so that it is possible to provide a realistic feeling to a viewer.

A DRAM 144 is connected to the DRAM (Dynamic Random Access Memory) interface 124. The DRAM 144 provides a storage area that temporarily stores data on which various sorts of signal processing and image processing will be carried out.

The omnidirectional camera 100 may further include an external storage interface 126, an external sensor interface 128, a USB (Universal Serial Bus) interface 130, and a serial block 132.

An external storage 146 is connected to the external storage interface 126. The external storage interface 126 controls reading data from and writing data to the external storage 146 such as a memory card inserted into a memory card slot.

An acceleration sensor 148 is connected to the external sensor interface 128. The acceleration sensor 148 detects three-axis acceleration components. The detected acceleration components are used to detect the vertical direction to perform zenith correction of an omnidirectional image.

A USB connector 150 is connected to the USB interface 130. The USB interface 130 controls USB communications implemented with an external apparatus such as a personal computer that is connected via the USB connector 150.

The serial block 132 controls serial communications implemented with an external apparatus such as a personal computer. A NIC (Network Interface Card) 152 is connected to the serial block 132.

After the power is turned on in the omnidirectional camera 100 as a result of a power switch being operated, the control program stored by the ROM 114 is loaded on a main memory.

The CPU 112 controls operations of components of the omnidirectional camera 100 according to the control program loaded on the main memory, and temporarily stores data to be used to control the components.

Thereafter, in response to the shutter button 16 being pressed, the CPU 112 controls the image pickup devices 22A and 22B and the microphones 142A-142D to acquire images and sound.

As a result of various hardware components performing processes to adjust playback timing between the images and the sound, an omnidirectional moving image enabling playback of stereophonic sound is generated.

The omnidirectional moving image is output to a playback machine via a video output interface 118. Note that the omnidirectional moving image may be output to an external apparatus connected via the USB connector 150 or the radio NIC 152.

Thus, the configuration of the omnidirectional camera 100 according to the embodiment of the present invention including the at least four microphones 142A-142D has been described.

Note that the same or a similar function may be implemented by an image pickup system where the respective components such as the image pickup unit 12, the microphones 142A-142D, and so forth are separately installed.

Next, a type of sound depending on the number of microphones by which the sound is acquired will be described.

FIGS. 4A-4D illustrate various numbers and arrangements of microphones. Dots illustrated in FIGS. 4A-4D denote microphones or the positions of microphones. FIGS. 4A-4D illustrate respective cases where the number of microphones is one, two, three, and four.

First, the case of FIG. 4A will be described. A single microphone can acquire sound from all surrounding directions or sound from a specific direction. In this case, playback of sound reflecting the direction of a sound source is not possible, and monaural playback is possible.

Next, the case of FIG. 4B will be described. Two microphones can acquire sound reflecting a one-dimensional difference. Therefore, playback of the sound as sound with which the direction of a sound source can be identified is possible. That is, playback of sound acquired by two microphones with the use of two corresponding speakers enables reproduction of the sound as stereo sound indicating the direction of a sound source.

Next, the case of FIG. 4C will be described. Three microphones can define a plane unless the three microphones are installed on a straight line. For example, as illustrated in FIG. 4C, three microphones can define an x-y plane, where the three microphones are installed at the respective vertexes of a triangle. The three microphones in this arrangement can acquire sound reflecting a two-dimensional difference. Therefore, playback of the sound as sound with which the direction of a sound source on an x-y plane can be identified is possible. For example, playback of sound acquired by the microphones with the use of two speakers enables synthesization of sound taking volume into account and indicating the direction of a sound source on a plane.

Finally, the case of FIG. 4D will be described. Four microphones can define a space in a case where the microphones are installed in an x-y-z space. For example, as illustrated in FIG. 4D, four microphones are not installed on a single plane, and are installed at the respective vertexes of a triangular pyramid. The microphones in this arrangement can acquire sound reflecting a three-dimensional difference. Therefore, playback of the sound as sound with which the direction of a sound source in a space can be identified is possible. Thus, playback of the sound as stereophonic sound is possible. For example, playback of a moving image with the use of an apparatus such as a head mount display enables playback of sound according to the direction of a user's sight line.

The omnidirectional camera 100 according to the embodiment may include five or more microphones for reproducing an image with a realistic feeling. Also in a case where the number of the microphones is five or more, a realistic feeling can be provided similarly to the case where the number of microphones is four.

Next, actual arrangements of the microphones 142A-142D according to the arrangement illustrated in FIG. 4D will be described with reference to FIGS. 5A-7C.

FIGS. 5A-5C illustrate examples of arrangements of the microphones 142A-142D in the omnidirectional camera 100 according to the embodiment.

FIG. 5A illustrates definitions of x, y, and z axes of the omnidirectional camera 100 that is schematically illustrated in FIG. 5A.

The x axis is parallel to the optical axes of the front optical element groups 25A and 25B of the image forming optical systems 20A and 20B of the omnidirectional camera 100.

The z axis is parallel to the optical axes of the rear optical element groups 26A and 26B of the image forming optical systems 20A and 20B of the omnidirectional camera 100.

The y axis is perpendicular to each of the x axis and the z axis.

FIG. 5B illustrates an example where the four microphones 142A-142D are installed at positions a, b, c, and d. For example, respective x, y, z coordinates of these positions a, b, c, and d can be expressed as follows:

coordinates of position a=$(\alpha, 0, 0)$
coordinates of position b=$(-\alpha, 0, 0)$
coordinates of position c=$(0, \alpha, \beta)$
coordinates of position d=$(0, -\alpha, \beta)$
where $\alpha$ and $\beta$ denote real numbers each being greater than 0.

The positions a and b are on the x axis. The positions c and d are on a straight line parallel to the y axis on the y-z plane. Thus, all of the positions a, b, c, and d are not on a single plane, and form a triangular pyramid where the positions a, b, c, and d are at the respective vertexes.

That is, by installing the microphones 142A-142D at the positions a, b, c, and d, respectively, illustrated in FIG. 5B, it is possible to define a space. Thereby, it is possible to acquire and perform playback stereophonic sound reflecting a three-dimensional difference.

In an example of FIG. 5C, the 4 microphones 142A-142D are installed at positions e, f, g, and h, respectively. For example, x, y, z coordinates of these positions can be expressed as follows:

coordinates of position e=$(0, 0, \alpha)$
coordinates of position f=$(-\beta, -\gamma, 0)$
coordinates of position g=$(\alpha', 0, 0)$
coordinates of position h=$(-\beta', \gamma', 0)$
where $\alpha, \beta, \gamma, \alpha', \beta'$, and $\gamma'$ denote real numbers each being greater than 0.

The position e is on the z axis. The three positions f, g, and h are on the x-y plane, and all of the positions f, g, and h are not on a single straight line. Thus, the positions e, f, g, and h also form a triangular pyramid where the positions e, f, g, and h are at the respective vertexes.

That is, by installing the microphones 142A-142D at the positions e, f, g, and h, respectively, illustrated in FIG. 5C, it is possible to define a space. Thereby, it is possible to acquire and perform playback stereophonic sound reflecting a three-dimensional difference.

In an example of FIG. 5D, the 4 microphones 142A-142D are installed at positions i, j, k, and m, respectively. For example, x, y, z coordinates of these positions can be expressed as follows:

coordinates of position i=$(\alpha, 0, \beta'')$
coordinates of position j=$(-\alpha, 0, \beta'')$
coordinates of position k=$(0, \alpha, \beta')$
coordinates of position m=$(0, -\alpha, \beta')$
where $\alpha, \beta'$, and $\beta''$ denote real numbers each being greater than 0.

The positions i and j are on a straight line parallel to the x axis on the x-z plane. The positions k and m are on a straight line parallel to the y axis on the y-z plane. Thus, the positions i, j, k, and m are also not on a single plane, and form a triangular pyramid where the positions i, j, k, and m are at the respective vertexes.

That is, by installing the microphones 142A-142D at the positions i, j, k, and m, respectively, as illustrated in FIG. 5D, it is possible to define a space. Thereby, it is possible to acquire and perform playback stereophonic sound reflecting a three-dimensional difference.

In this regard, distances between the microphones 142A-142D are not particularly limited. Next, influences caused by distances between the microphones 142A-142D in various combinations will be described.

For example, in a case where a distance between microphones is very small, a difference is not likely to occur between low-frequency sound signals acquired by the respective microphones. Thus, a low-frequency noise may be generated when a stereophonic sound is synthesized.

In a case where a distance between microphones is very large, there may be no phase difference between the respective sound signals at a high-frequency side due to phase rotation. As a result, directivity of stereophonic sound may not satisfactorily be formed.

In addition, the respective distances between the microphones 142A-142D in all combinations may be made equal to each other for implementing an arrangement of the microphones 142A-142D in consideration of individual variance in characteristics. Therefore, an ideal arrangement of the microphones 142A-142D is such that a regular tetrahedron is formed with the respective vertexes at which the 4 microphones 142A-142D are installed.

Next, examples of an arrangement of the image pickup unit 12 and the microphones 142A-142D included in the omnidirectional camera 100 will be described.

As a first example, a case where the microphones 142A-142D are arranged at the positions a, b, c, and d illustrated in FIG. 5B will now be described with reference to FIGS. 6A-6C.

FIGS. 6A-6C are a perspective view, a front elevational view, and a side elevational view of an arrangement of the image pickup unit 12 and the microphones 142A-142D, respectively.

In the first example, as illustrated in FIGS. 6A-6C, the four microphones 142A-142D are installed on substrates above and below the image forming optical systems 20A and 20B included in the image pickup unit 12.

In this regard, an actual installation manner of the microphones 142A-142D is not limited to the installation manner using the substrates. As another installation manner, the microphones 142A-142D may be fixed to the housing 14. As yet another installation manner, cables of the microphones 142A-142D may be connected to the housing 14.

In more detail, the two microphones 142A and 142B are installed below the image forming optical systems 20A and 20B, respectively, on the x axis of the omnidirectional camera 100 illustrated in FIG. 5A, at the positions a and b illustrated in FIG. 5B, respectively.

The microphones 142A and 142B are installed on a straight line (that may be coincident with the x axis) parallel to the optical axes of the front optical element groups 25A and 25B of the image forming optical systems 20A and 20B.

Above the image forming optical systems 20A and 20B, the two microphones 142C and 142D are installed on a straight line parallel to the y axis of the omnidirectional camera 100 illustrated in FIG. 5A, at the positions c and d illustrated in FIG. 5B, respectively.

The above-mentioned straight line on which the microphones 142C and 142D are installed is perpendicular to the optical axes of the front optical element groups 25A and 25B and perpendicular to the optical axes of the rear optical element groups 26A and 26B.

Thus, all of the four microphones 142A-142D are not on a single plane. A triangular pyramid is formed with the respective vertexes at which the microphones 142A-142D are installed.

Note that, the distance between the microphones 142A and 142C, the distance between the microphones 142A and 142D, the distance between the microphones 142B and 142C, and the distance between the microphones 142B and 142D may be equal to each other. Further, the distance between the microphones 142A and 142B may be equal to the distance between the microphones 142C and 142D.

As illustrated in FIGS. 6A-6C, the microphones 142A and 142B may be installed along respective straight lines each being parallel to the z axis of the omnidirectional camera 100 illustrated in FIG. 5A. In this regard, the z axis may be coincident with the respective optical axes of the rear optical element groups 26A and 26B of the image forming optical systems 20A and 20B.

The microphones 142C and 142D may be installed in such a manner that the respective distances of the microphones 142C and 142D from the z axis, along the above-mentioned straight line on which the microphones 142C and 142D are installed, are equal to one another.

In addition, the microphones 142C and 142D may be installed along respective straight lines each being parallel to the x axis of the omnidirectional camera 100 illustrated in FIG. 5A. In this regard, the x axis may be parallel to the respective optical axes of the front optical element groups 25A and 25B of the image forming optical systems 20A and 20B.

As illustrated in FIG. 6C, the microphones 142A-142D may be installed between the respective planes A-A' and B-B' including the planes of the openings 15A and 15B of the housing 14 formed to expose lenses of the image forming optical systems 20A and 20B, respectively.

The microphones 142A-142D may be installed on side faces of substrates that are installed further inside than portions of the image forming optical systems 20A and 20B; the portions protruding from the housing 14. In addition, the microphones 142A-142D may be installed further inside than the portions of the image forming optical systems 20A and 20B; the portions protruding from the housing 14. If the microphones 142A-142D were installed further outside than the portions of the image forming optical systems 20A and 20B, the portions protruding from the housing 14, the microphones 142A-142D might appear in images taken by the image pickup unit 12 that includes the image forming optical systems 20A and 20B.

As a second example, a configuration where the microphones 142A-142D are installed at the points e, f, g, and h illustrated in FIG. 5D will now be described with reference to FIGS. 7A-7C. FIGS. 7A-7C are a perspective view, a front elevational view, and a side elevational view of an arrangement of the image pickup unit 12 and the microphones 142A-142D according to the second example.

According to the second example, as illustrated in FIGS. 7A-7C, the four microphones 142A-142D are installed above the image forming optical systems 20A and 20B of the image pickup unit 12. In more detail, the two microphones 142A and 142B are installed on a straight line parallel to the x axis of the omnidirectional camera 100 illustrated in FIG. 5A, above the image forming optical systems 20A and 20B, at the above-mentioned positions i and j illustrated in FIG. 5D, respectively.

The other two microphones 142C and 142D are installed also above the image forming optical systems 20A and 20B of the image pickup unit 12. In more detail, the two microphones 142C and 142D are installed on a straight line parallel to the y axis of the omnidirectional camera 100 illustrated in FIG. 5A, above the image forming optical systems 20A and 20B, at the above-mentioned positions k and m illustrated in FIG. 5D, respectively.

Thus, all of the four microphones 142A-142D are not installed on a single plane. A triangular pyramid is formed with the respective vertexes at which the microphones 142A-142D are installed.

In addition, according to the second example, the microphones 142A-142D are installed in such a manner that the respective distances between the microphones 142A-142D in all combinations are equal to each other. Thus, a regular tetrahedron is formed with the respective vertexes at which the microphones 142A-142D are installed.

In the same way as the first example described above with reference to FIGS. 6A-6C, also the microphones 142A-142D according to the second example may be installed further inside than portions of the image forming optical systems 20A and 20B; the portions protruding from the housing 14. If the microphones 142A-142D were installed further outside than the portions of the image forming optical systems 20A and 20B, the portions protruding from the housing 14, the microphones 142A-142D might appear in images taken by the image pickup unit 12 that includes the image forming optical systems 20A and 20B.

A case where the number of microphones is five or more will now be described.

FIGS. 8A and 8B illustrate examples where five microphones are installed in the omnidirectional camera 100.

FIG. 8A illustrates an example where a pentahedron having the five vertexes at which the five microphones are installed is a quadrangular pyramid.

FIG. 8B illustrates an example where a hexahedron having the five vertexes at which the five microphones are installed is a triangular dipyramid.

Note that, for a case where the number of microphones is more than five, an arrangement of the microphones can be determined a similar manner.

In the example of FIG. 8A, the microphones are installed at positions a, b, c, and d on an x-y plane and a position e on a z axis, respectively. Thus, the microphones installed at the positions a-d are installed on the single plane.

In the example of FIG. 8B, the microphones are installed at positions a, b, and c on an x-y plane and positions d and e on a z axis, respectively. In the arrangement illustrated in FIG. 8B, four microphones selected from among the five microphones in any combination are not installed on a single plane.

Note that, concerning the respective examples of arrangements of microphones illustrated in FIGS. 5B-5D, 8A, and 8B, the positional relationship between the omnidirectional camera 100 and the x, y, and z axes is not limited to the positional relationship between the omnidirectional camera 100 and the x, y, and z axes described above with reference to FIG. 5A. That is, the origin of the x-y-z coordinate system illustrated in FIGS. 5B-5D, 8A, and 8B may be freely shifted to any position with respect to the omnidirectional camera 100. For example, each of the x-y-z coordinate systems in the arrangements illustrated in FIGS. 5B, 5C, 8A, and 8B may be shifted to a position above the image forming optical systems 20A and 20B so that all the microphones may be installed above the image forming optical systems 20A and 20B as in the example shown in FIGS. 7A-7C.

For a case where the number of the microphones installed in the omnidirectional camera 100 is four, the respective distances between the microphones in all combinations may be equal to each other and a regular tetrahedron may be formed with the respective vertexes at which the microphones are installed. Thereby, it is possible to simplify a process to be carried out on sound acquired from the four microphones.

In the embodiments of the present invention, the microphones may be installed on the surface of a virtual sphere so that an influence from individual variance in characteristics of the respective microphones can be further reduced. In more detail, by installing the microphones in the omnidirectional camera 100 in such a manner that a polyhedron that has the respective vertexes at which the microphones are installed has a circumscribed sphere as illustrated in FIGS. 8A and 8B, it is possible to further reduce an influence caused by individual variance.

Note that, for a case where the number of the microphones installed in the omnidirectional camera 100 is four, a polyhedron having the respective vertexes at which the microphones are installed is a regular tetrahedron for a case where the respective distances between the microphones in all combinations are equal to each other. Therefore, in this case, the polyhedron having the respective vertexes at which the microphones are installed is necessarily a polyhedron having a circumscribed sphere.

For a case where the number of the microphones installed in the omnidirectional camera 100 is five or more, it is possible to effectively reduce an influence from the individual variance by installing the microphones in such a manner that a polyhedron having the respective vertexes at which the microphones are installed may have a circumscribed sphere and the lengths of the respective sides of the polyhedron may be equal to each other.

According to the embodiments described above, it is possible to provide an image pickup apparatus and an image pickup system with which it is possible to reproduce an image with a realistic feeling.

Thus, the image pickup apparatuses and the image pickup systems have been described in the embodiments. However, the present invention is not limited to these embodiments, and various modifications and improvements can be made without departing from the scope of the present invention.

The present application is based on Japanese Patent Application No. 2017-050712, filed on Mar. 16, 2017, the entire contents of which are hereby incorporated herein by reference.

REFERENCE SIGNS LIST 12 image pickup unit
14 housing
16 shutter button
20A, 20B image forming optical systems
22A, 22B image pickup devices
100 omnidirectional camera
112 CPU
114 ROM
116 moving image compression block
118 video output interface
120 image processing block
122 sound signal processing block
124 DRAM interface
126 external storage interface
128 external sensor interface
130 USB interface
132 serial block
142A-142D microphones
144 DRAM
146 external storage
148 acceleration sensor
150 USB connector
152 radio NIC

CITATION LIST

Patent Literature

[PTL 1] Japanese Unexamined Patent Application Publication No. 2001-298733

The invention claimed is:

1. An image pickup apparatus, comprising:
an image forming optical system that includes a plurality of wide angle lenses;
a housing including two planes having openings through which at least portions of the wide angle lenses protrude, wherein a first plane of the two planes includes a shutter button and a second plane of the two planes is arranged opposite the first plane;
an image pickup device; and
four or more sound pickup devices installed at respective vertexes of a triangular pyramid,
wherein a first pair of sound pickup devices of the four or more sound pickup devices are installed between the two planes on a first axis parallel to an optical axis of the image forming optical system, the first axis being on a first side of the image forming optical system;
and
a second pair of sound pickup devices of the four or more sound pickup devices, different from the first pair, are installed on a second axis perpendicular to the first axis, and on a second side of the image forming optical system, wherein the second pair of sound pickup devices are on planes other than the two planes and are inside the housing.

2. The image pickup apparatus according to claim 1, wherein respective distances between the four or more sound pickup devices in all combinations are equal to each other.

3. The image pickup apparatus of claim 1, wherein the first pair of sound devices are located between the image pickup device and an inner wall of the housing of the image pickup apparatus in a direction parallel to the optical axis.

4. The image pickup apparatus of claim 1, wherein the four or more sound pickup devices are fixed to the housing of the image pickup apparatus.

5. The image pickup apparatus of claim 1, wherein the four or more sound pickup devices are fixed to substrates of the image pickup apparatus.

6. The image pickup apparatus of claim 1, wherein the four or more sound pickup devices are installed on side faces of a substrate located in an interior of a housing of the image pickup apparatus.

7. The image pickup apparatus of claim 1, wherein the shutter button is located below the image forming optical system.

8. The image pickup apparatus of claim 1, wherein the first pair of sound pickup devices are located between the image forming optical system and the shutter button.

9. An image pickup system, comprising:
an image forming optical system that includes a plurality of wide angle lenses;

a housing including two planes having openings through which at least portions of the wide angle lenses protrude, wherein a first plane of the two planes includes a shutter button and a second plane of the two planes is arranged opposite the first plane;

an image pickup device; and four or more sound pickup devices installed at respective vertexes of a triangular pyramid, wherein a first pair of sound pickup devices of the four or more sound pickup devices are installed between the two planes on a first axis parallel to an optical axis of the image forming optical system, the first axis being on a first side of the image forming optical system; and a second pair of sound pickup devices of the four or more sound pickup devices, different from the first pair, are installed on a second axis perpendicular to the first axis, and on a second side of the image forming optical system, wherein the second pair of sound pickup devices are on planes other than the two planes and are inside the housing.

10. An image pickup apparatus, comprising:

a first image forming optical system and a second image forming optical system, each including wide angle lenses that protrude from first and second openings, respectively, on opposite sides of a housing;

the housing; and four or more sound pickup devices, each located between a first plane defined by and including a portion of a first side of the housing, the portion of the first side being flat, and a second plane defined by and including a portion of a second side of the housing opposite to the first plane, the portion of the second side being flat, wherein the first and second planes are perpendicular to an optical axis of at least the first image forming optical system and extend in a longitudinal direction of the housing;

the first and second openings are located on the first and second planes, respectively; and a first pair of the sound pickup devices is located between the first and second planes and on a first side of the first and second openings in the longitudinal direction, and a second pair of the sound pickup devices is located between the first and second planes and on a second side of the first and second openings, opposite the first side, in the longitudinal direction, wherein at least two of the four or more sound pickup devices are installed on an axis parallel to the optical axis.

11. The image pickup apparatus of claim 10, wherein at least two of the four or more sound pickup devices are installed on a first axis parallel to a second axis that is perpendicular to the optical axis.

12. The image pickup apparatus of claim 11, wherein the at least two of the four or more sound pickup devices are installed along respective axes parallel to an optical axis of a rear element group.

13. The image pickup apparatus of claim 12, wherein the at least two of the four or more sound pickup devices are installed on a first side of the image forming optical system on which a shutter button of the image pickup apparatus is located.

14. The image pickup apparatus of claim 10, wherein a shutter button of the image pickup apparatus is located on one of the first plane and the second plane.

15. The image pickup apparatus of claim 10, wherein the housing is substantially a rectangular parallelepiped.

* * * * *